UNITED STATES PATENT OFFICE.

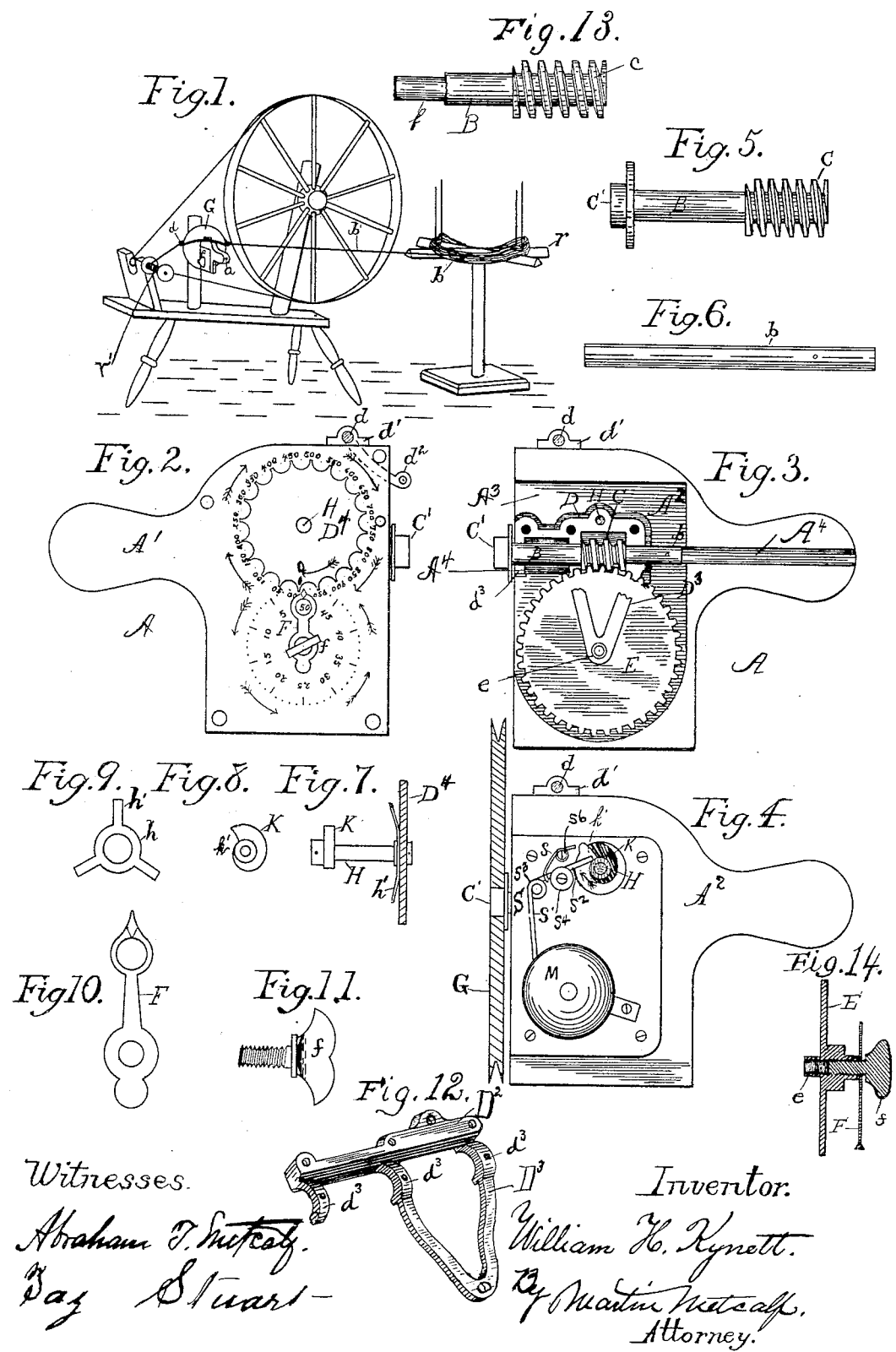

WILLIAM H. KYNETT, OF BATTLE CREEK, MICHIGAN.

WARP OR LINE MEASURING MACHINE.

SPECIFICATION forming part of Letters Patent No. 478,115, dated July 5, 1892.

Application filed June 8, 1891. Serial No. 395,546. (No model.)

*To all whom it may concern:*

Be it known that I, WILLIAM H. KYNETT, a citizen of the United States, residing at Battle Creek, in the county of Calhoun and State of Michigan, have invented certain new and useful Improvements in Warp or Line Measuring Machines, of which the following is a specification.

This invention has particular reference to machines for measuring the warp for weaving-looms; but it may be usefully employed for the measurement and registering of any kind of line thread or cord.

My invention has for its immediate object to provide a convenient and simple device adapted to be attached to the ordinary hand spinning-wheel which will accurately measure and register the number of yards transferred from the reel to the bobbin of the spinning-wheel and sound a signal when the desired number of yards has been so transferred.

The invention is fully illustrated in the accompanying drawings, in which—
Figure 1 is a perspective view of a hand-loom with my improved register attached thereto. Fig. 2 is a front face view of my improved measuring and registering device having the line-wheel removed. Fig. 3 shows the interior thereof with a portion of the yoke broken away. Fig. 4 is a rear view showing the line-wheel in section. Figs. 5, 6, 7, 8, 9, 10, and 11 are detached details thereof. Fig. 12 is a perspective view of a section of the yoke.
Fig. 13 is a view of the main shaft and internal tube, the former being broken away near one end to show the latter; and Fig. 14 is a section through the pinion E, pointer F, and thumb-screw $f$, said parts being removed from the case.

A designates the casing, which consists of the two parts A' and A², each being of the same form and constructed with a recess, which when the two parts are secured together will form a chamber within the casing for the operative parts of my device.

B designates the main shaft, which is formed near one end with a worm C. This shaft has its bearings in a yoke D, which is firmly fixed to the casing at its upper end. This yoke is made in two parts, (one of which D² is shown in Fig. 12,) which are suitably secured together and to the casing and each formed with segmental portions $d^3$, which when the parts are together form the bearings for the shaft B, and said part D² being also provided with the centrally-depending arm D³, whose lower end is formed with an opening which receives the arbor $e$ of the pinion E, which latter engages the worm on the shaft B.

The outermost end of the shaft B is provided with a collar C', on which is fixed the line or warp measuring wheel G, and running parallel with the face of said wheel and at right angles with said shaft B is the line or warp guide $d$, whose fixed central supporting-box $d'$ is situated on the top of the casing A and a trifle to the rear of the line-wheel G. The extreme outermost ends of the line-guide $d$ are bent to form eyes $d^2$ for engagement of the warp or line to be measured in passing to, over, and from said line-wheel, as shown. The arbor $e$ is hollow and internally screw-threaded, and the index-finger F is removably and adjustably fixed thereto by means of the left-hand-threaded thumb-screw $f$, as shown best in Fig. 14.

A transverse shaft H, situated vertically above the axle or bearing of the wheel or pinion E and on the side opposite the longitudinal shaft B, carries the dial or registering wheel D⁴, the numbers corresponding with the graduated periphery of which being intended to indicate the number of yards passing around the wheel G, according to the revolutions made by the latter. This shaft H has its bearing in the yoke D or in the casing, whichever is preferred. The end of the shaft H opposite the dial-wheel D⁴ carries a fixed spiral cam K. S designates the bell-hammer, which consists of the parts $s'$ and $s^2$, extending at substantially right angles to each other, and the coil $s^3$ between said parts $s'$ and $s^2$. The outer or free end of the part $s'$ has an enlargement (not shown) which strikes the bell M and sounds the alarm, and the free end of the part $s^2$ is located in the path of spiral cam K, so as to be engaged by said cam K, and intermediate of its length said part $s^2$ is provided with a hollow enlargement $s^4$, through which loosely passes a screw or other suitable means, which holds said hammer to the casing and on which said hammer turns as on a pivot.

$s$ designates a spring which is bent at one end into engagement with said part $s^2$ of the hammer and near its opposite end is coiled around a screw $s^6$ or other suitable fastening means. A thin metallic washer $h$, provided with three or more spring-arms $h'$, serves to steady and hold the wheel $D^4$ in its proper position on said shaft H and parallel with the face of the dial at all times.

In order that my device may be practical for use with the domestic or hand spinning-wheels, it becomes necessary to support it from the same in a manner which will permit it to be moved, as the winding progresses, back and forth parallel with the bobbin of the spinning-wheel, between which bobbin and a suitable reel my device is located, so that the thread may be wound evenly on said bobbin, and also to so support it as to permit it to have such movement without interfering with the free rotation of the shaft B. To this end I form the shaft B cylindrical and pass loosely through it a thin tube $b$, which may be fixed to the yoke or to one side of the casing. The two-part casing is divided vertically and centrally of its length to form the chamber $A^3$ and secured together by means of screws or screw-bolts, as shown, while a central semicircular channel in each part forms when the two are fixed together a longitudinal channel $A^4$ for the said shaft B, tube $b$, and the spindle $a$ of the spinning-wheel, which spindle passes through said tube $b$ and into and through the handle portion of the casing.

The operation of my invention is as follows: The line to be wound on the bobbin of the spinning-wheel and at the same time measured is first placed on any convenient support or reel, as shown at $r$, Fig. 1 of the drawings, and the outermost end thereof passed through the forward eye of the guide $d$ of the measuring-machine, thence once around and within the groove of the wheel G, then through the eye at the opposite end of said guide, and to the bobbin $r'$ of the old-fashioned domestic spinning-wheel. The dial-wheel $D^4$ and index-finger F must now be set to the number of yards desired, as indicated by the figures "100," "150," "200," &c., of said dial-wheel $D^4$, and corresponding numerals "5," "10," "15," &c., of the index-finger plate or face, these figures corresponding with twice the number of revolutions of the wheel G, its circumference in the present instance equaling one-half a yard, although said wheel may be made of circumference to give a single yard or more at each revolution, as is evident. For example, suppose we wish to measure off two hundred yards, lineal measure, and to have the alarm sounded when the required length is recorded. The wheel $D^4$ is turned to the left, as indicated by the arrows, until the initial point thereon marked "0" indicates that the circumferential tooth of said wheel coincides with the numerals "200." The thumb-screw is then loosened and the index-finger moved around the circle in the direction indicated by the arrow until the pointed end of said finger comes into contact with the right-hand side of the tooth of wheel $D^4$, directly in a vertical line with the axis of wheel $D^4$, and while the pointer covers the number "50" at the top of said finger-plate. The thumb-screw is now tightened and the index-finger thereby fastened to the arbor $e$. Now, the index-finger having been properly set and the device engaged with the spindle $a$ and the line properly engaged with the device, the operator turns the wheel proper of the spinning-wheel, which, as is well known, revolves the bobbin, and the line passing over said wheel G rotates the latter, whereby by means of the train of gearing above described connecting it with the index-finger F the latter will be carried continuously around the circle in the direction opposite to that indicated by the arrows. At every revolution of said finger F its outermost point impinges against the left-hand side of the lowermost tooth of the wheel $D^4$, registering fifty yards, and at the same time moving wheel $D^4$ one tooth to the right, whereby as the said index-finger is made to swing around the circle until the number "200" registers with the index-mark "0" of said wheel $D^4$ the shaft H, carrying the eccentric K, is caused to revolve, said eccentric in its movement engaging the free end of the part $s^2$ of the hammer S, moving said end in the direction indicated by the arrow in Fig. 4 and the other end of said hammer (which end is located within the bell) away from that portion of the bell which it strikes. This movement continues until the reduced or cut-away portion $k'$ of the spiral cam has reached said hammer, thereby releasing the bell-hammer, and the spring $s$ then comes into play and forces the inner free end of the part $s^2$ into said reduced portion $k'$ and the free end of the part $s'$ in the opposite direction, so that the latter is caused to strike the bell M and sound the signal that the desired two hundred yards of line has been transferred from the reel to the bobbin.

As above stated, it is necessary in order that the warp or line will be wound evenly on the bobbin for the measurer and register to be moved to and from the operator in the direction of the length of the bobbin, and such movement is given the device by the operator, who grasps it by its handle portion and moves it horizontally on the spindle $a$.

For measuring any number of yards less than or up to two hundred the index-finger F is set, as indicated by the figures, on the face of the lower dial-plate, having first placed the initial point "0" of the wheel $D^4$ upon the vertical line below the axis thereof.

Having now described my invention, what

I believe to be new, and desire to secure by Letters Patent, is—

1. In a warp or line measuring machine, the combination of the shaft B, having a worm on its inner end and a wheel on its outer end, a pinion beneath said shaft engaging said worm, said pinion having a hollow internally-screw-threaded arbor, an index-finger, a thumb-screw engaging said hollow arbor and serving to adjustably secure said finger thereto, a dial-plate, a dial or registering wheel engaged and operated by said finger, an alarm-bell, and a bell-hammer operated from said dial-wheel.

2. In a warp or line measuring machine, the shaft B, having a worm at one end, a grooved wheel on the other end of said shaft, a yoke supporting said shaft, a pinion supported by said yoke beneath said shaft and engaging the worm thereof, a dial-plate, and a pointer adjustably connected to said pinion and operating therewith, as described, in combination with a casing to which said dial is secured, said casing having a chamber within which said shaft, pinion, and yoke are located.

3. In a warp or line measuring machine, the combination, with a main operating-shaft and a dial-plate, of a pointer operated through intermediate connection or gearing by said shaft, a shaft H above said main shaft, a dial or registering wheel on said shaft H, operated by said pointer, and a spring-washer for holding said dial-wheel in position on its shaft and parallel with the face of the dial-plate.

4. In a warp or line measuring machine, a shaft, a wheel mounted on the outer end of said shaft and designed to be engaged by the warp or line to be measured, and a pinion geared with the inner end of said shaft, said pinion having a screw-threaded arbor, in combination with a dial-plate, a dial or registering wheel, a pointer or index-finger engaged with and operating said dial-wheel, and a thumb-screw for adjustably securing said pointer to said arbor, substantially as described, and for the purposes specified.

5. In a warp or line measuring machine, a shaft, a wheel mounted on the outer end thereof and designed to be engaged by the warp or line to be measured, and a pinion geared with the inner end of said shaft, said pinion having a screw-threaded arbor, in combination with a dial-plate, a dial or registering wheel, an alarm mechanism operated from said dial or registering wheel, an index-finger or pointer engaged with and operating said dial-wheel, and a thumb-screw for adjustably securing said pointer to said arbor, substantially as described, and for the purposes specified.

6. In a warp or line measuring machine, the shaft B, having a worm on its inner end and a wheel on its outer end, a pinion beneath said shaft engaging the worm thereof, a dial-plate, and a dial or registering wheel, in combination with an alarm mechanism connected with said dial or registering wheel, a pointer engaging and operating said dial or registering wheel, and a means for adjustably securing said pointer to the arbor of said pinion, substantially as described, and for the purposes specified.

7. In a warp or line measuring machine, the combination, with a main operating-shaft, a dial-plate, and a pointer operated through intermediate connection or gearing by said shaft, of a shaft H above said main shaft, a dial or registering wheel on one end of said shaft, operated by said pointer, a cam secured to and rotating with shaft H, a bell-hammer, one end of which is located in the path of the cam, a spring engaging said bell-hammer at one end, and a bell adjacent to the other end of said bell-hammer.

8. In a warp or line measuring machine, the two-part chambered casing, main operating-shaft thereon, yoke supporting said shaft and having depending converging arms formed with an opening at their lower joined ends, a pinion E, geared with said shaft and having a screw-threaded opening, a pointer F, a thumb-screw adjustably securing said pointer in place, a shaft H, and a dial-plate $D^4$ thereon, all arranged, combined, and operating substantially as shown and described.

9. In a warp or line measuring machine adapted to be supported by and reciprocated on a spindle or rod projecting from a spinning-wheel, the combination of the casing having a handled portion, a main cylindrical shaft within said casing, bearings for said shaft, registering mechanism operated from said shaft, and a fixed tube passing loosely through said shaft and adapted to engage said spindle or rod of the spinning-wheel, substantially as described, and for the purposes specified.

10. In a warp or line measuring machine of the character set forth, the combination of the casing having a handle portion by which it may be moved back and forth, as described, a main cylindrical shaft within said casing, bearings for said shaft, a line-wheel on the outermost extremity of said shaft, a guide secured to said casing and having eyes through which the warp or line passes on its way to said wheel, registering mechanism operated from said main shaft, and a fixed tube passing loosely through said main shaft and adapted to engage the rod or spindle upon which the device is supported and reciprocated, as set forth.

11. In a line or warp measuring machine, the casing provided with a handled portion, a main cylindrical shaft within said casing, a central hollow sleeve or tube within the cylinder of said shaft, one end of which sleeve or tube is fixed within and toward the handle portion of the casing, a line-wheel on the outermost extremity of and a worm located on an inner portion of said main shaft, and circumferential bearings fixed in said casing, a pinion engaging with the worm of the main shaft, and connected and engaging shafts, wheels, dials, and means, substantially as shown and described, for registering the linear length of the warp and for sounding a signal-bell when the predetermined revolutions of said line-wheel have been completed.

In testimony that I claim the foregoing I hereunto set my hand, this 1st day of December, A. D. 1890, in presence of two attesting witnesses.

WILLIAM H. KYNETT.

Witnesses:
JULIUS P. KING,
GEORGE A. BELL.